United States Patent [19]

Hirano et al.

[11] 4,004,672

[45] Jan. 25, 1977

[54] PRINTING CONTROL DEVICE

[75] Inventors: Reiji Hirano; Takayoshi Hanakata, both of Yokohama; Matsutoshi Ito, Narashino, all of Japan

[73] Assignee: Canon Kabushiki Kaisha, Tokyo, Japan

[22] Filed: Feb. 20, 1975

[21] Appl. No.: 551,397

[30] Foreign Application Priority Data

| | | |
|---|---|---|
| Feb. 22, 1974 | Japan | 49-21684 |
| Feb. 22, 1974 | Japan | 49-21686 |
| Feb. 12, 1975 | Japan | 50-17671 |

[52] U.S. Cl. .................... 197/1 R; 197/82; 197/133 R; 318/696; 346/76 R

[51] Int. Cl.[2] .................... B41J 3/20; B41J 19/00; G05B 19/40

[58] Field of Search ......... 197/1 R, 82, 84 R, 84 B, 197/133 R; 101/93.04, 93.05; 346/76 R; 318/138, 254, 696; 219/216

[56] References Cited

UNITED STATES PATENTS

| | | | |
|---|---|---|---|
| 2,656,240 | 10/1953 | Hell | 197/1 R |
| 3,267,346 | 8/1966 | Liang et al. | 318/138 |
| 3,322,252 | 5/1967 | West | 197/1 R |
| 3,770,091 | 11/1973 | Platt | 197/1 R |
| 3,814,011 | 6/1974 | Kashio | 197/1 R X |
| 3,823,808 | 7/1974 | Murata et al. | 197/133 R |
| 3,834,304 | 9/1974 | Potter | 197/1 R X |
| 3,844,395 | 10/1974 | Mero et al. | 197/133 R X |
| 3,845,850 | 11/1974 | Herr et al. | 197/133 R X |

FOREIGN PATENTS OR APPLICATIONS

| | | | |
|---|---|---|---|
| 2,139,647 | 3/1972 | Germany | 197/1 R |

*Primary Examiner*—Edgar S. Burr
*Assistant Examiner*—Paul T. Sewell
*Attorney, Agent, or Firm*—Fitzpatrick, Cella, Harper & Scinto

[57] ABSTRACT

A printer for use with a portable calculator, a handy typewriter or the like is provided with a printing control device which comprises a control circuit for controlling the operation of a stepping motor to feed a recording medium. In order to control the motor, the control circuit generates a series of printing control signals and stepping control signals which include an initial stepping control pulse and a final stepping control pulse. Before printing is started, the motor is stepped forwardly with the initial control pulse and is set in an initial condition to make a space preceding a character to be printed on the recording medium. After the printing of one character is performed, the motor is stepped forwardly with the last stepping control pulse to make sufficient space between adjacent characters to be recorded on the recording medium.

7 Claims, 15 Drawing Figures

PRINTING CONTROL DEVICE

BACKGROUND OF THE INVENTION

1. Field of the Invention

This invention relates to a printing control device suitable for use with a portable electronic calculator or a handy typewriter, and more particularly to a printing control device which is capable of always maintaining the position of a recording medium at a normal position at the start and end of printing.

2. Description of the Prior Art

In conventional portable printing devices used with the above mentioned electronic insturments, portable and low cost features have been considered of top importance. This has resulted in various faults. That is, since an electromagnet has been used to feed a recording medium and the control system has been simplified, overlap and uneven intra-character space printings have often occurred causing careless consumption and loss of recording medium. Especially in a device, for example, in which a tape form recording medium is fed with a step motor, the rotor of the motor often displaces from its normal stop position when the tape is carelessly extended or manually fed to a tape cutting position as required cut the tape. It is thus obvious that if the next printing operation starts with this condition, the initial printing position would be uneven with overlap printing being a result.

SUMMARY OF THE INVENTION

Therefore, an object of the invention is to provide an improved printing control device which solves the aforementioned disadvantages.

It is another object of the invention to provide a printing control device which is provided with a circuit to suitably control a step motor.

It is a further object of the invention to provide a printing control device which is provided with a control circuit to generate a motor step control signal equivalent to two printing lines advancement after the end of printing corresponding to the last column of one character.

It is still a further object of the invention to provide a printing control device which is provided with a control circuit for generating a motor advance control signal equivalent to one printing column before the start of printing corresponding to the initial line of one character.

It is still another object of the invention to provide a printing control device which is provided with a control circuit for generating a correction pulse to automatically correct the displacement of rotor position upon manual displacement of recording medium.

It is still another object of the invention to provide a printing control device which is provided with a control circuit which makes alphabetical printing in a good printing face appearance improved by providing a two-column space between characters in a printing device wherein one character is composed, for example, of a 5 × 7 dot matrix.

The other objects and characteristics of the invention will be understood in the detailed description with reference to the accompanying drawings, in which:

BRIEF DESCRIPTION OF THE DRAWINGS

FIG. 11, comprising

DESCRIPTION OF THE PREFERRED EMBODIMENTS

A printing control device of the invention is suitable for use with electronic instruments having a portable printing device which operate to distinguish character or sign into plural numbers of columns and channels, intermittently transmit a printing recording paper gradually by the distance equivalent to the space of each column relative to a printing head which prints the character or sign portion corresponding to the column by means of a stepping motor, and energize the printing head at each column interval to print the desired character or sign consisting of column portions on the recording paper.

Figure 1:
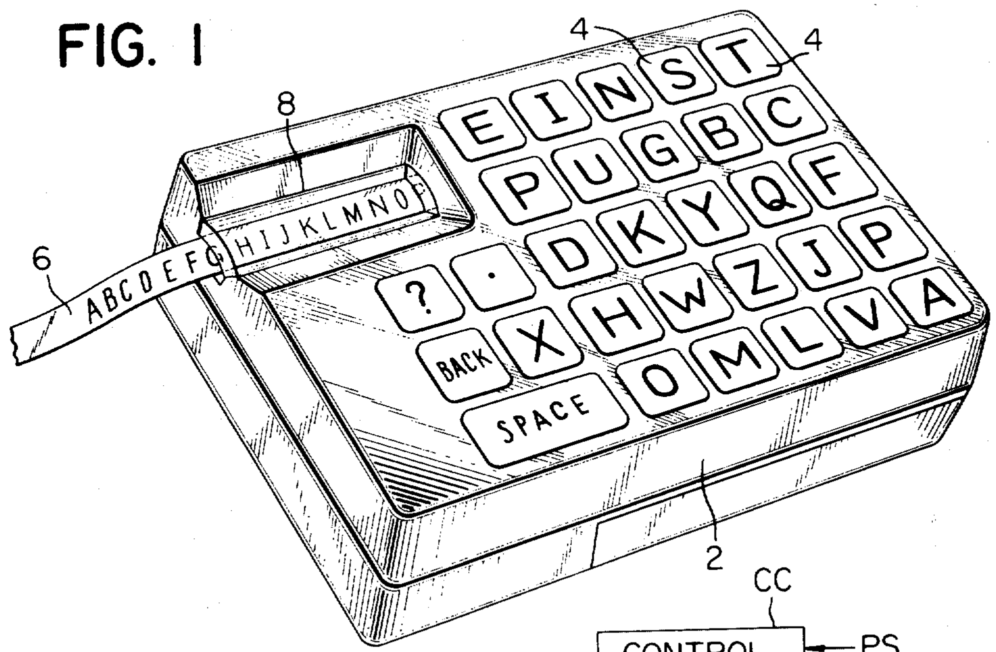
FIG. 1 is a schematic view of a handy typewriter embodying a printing control device according to the invention.

FIG. 1 is a perspective view of a handy typewriter suitable for application of a printing control device of the invention. The reference number 2 is a housing to enclose the printing mechanism and control circuit, 4 denotes keys provided on the housing for the selection of characters or signs to be printed, 6 denotes a tape form thermosensitive recording paper to record printing thereon by a thermal means and 8 denotes a transparent acryl window to magnify and read the character and sign recorded on said recording paper 6 with the printing mechanism (FIG. 2) provided in the housing 2.

Figure 2:
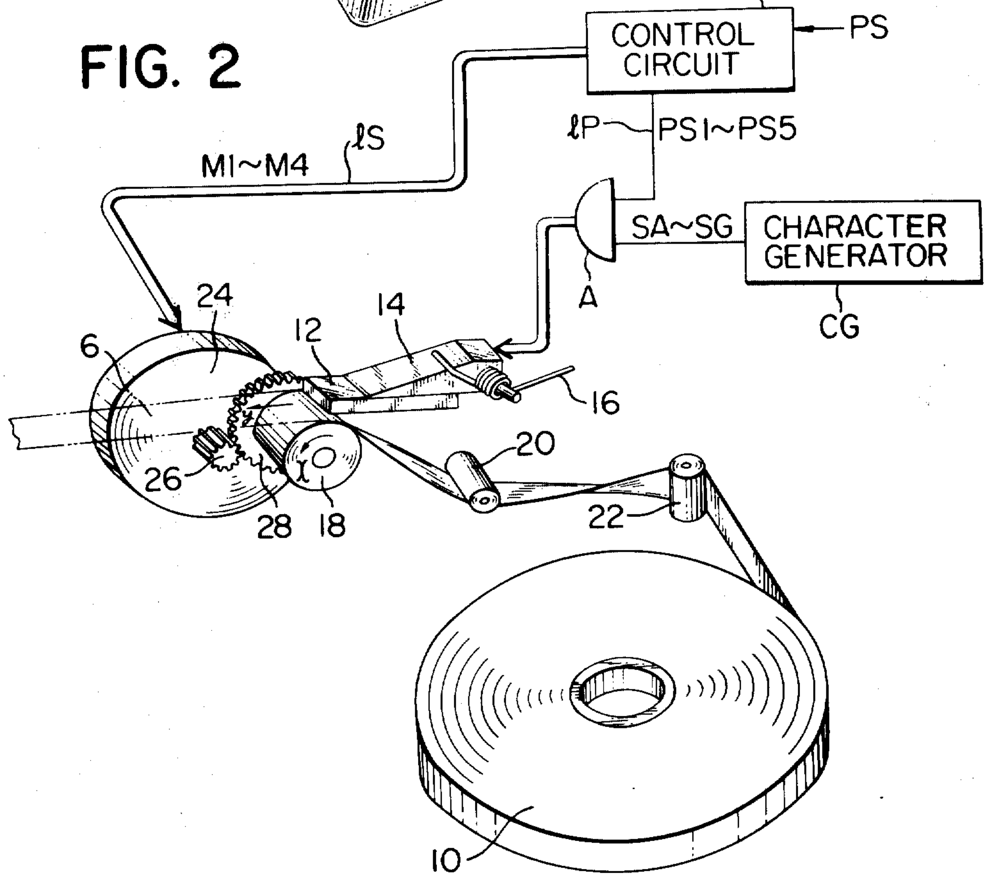
FIG. 2 is a basic conceptional view of a printing control device of the invention.

The above mentioned handy typewriter contains a printing mechanism as shown in FIG. 2. The number 10 indicates a recording paper roll with recording paper wound therearound for supply of said thermosensitive paper 6. Likewise, the number 12 indicates a thermal head for thermal recording on said paper 6. The number 14 indicates a head mounting base to support said thermal head. The number 16 indicates a spring to press said thermal head 12 onto said thermosensitive recording paper 6. The number 18 indicates a roller opposed to said thermal head 12 via said paper 6 to intermittently rotate in the arrow mark *x* direction for intermittently feeding said paper 6 in the *y* direction. The numbers 20 and 22 indicate guide rollers for leading the thermosensitive recording paper 6 from said recording paper roll 10 to the thermal head 12. The number 24 indicates a stepping motor for intermittently driving said feed roller 18 in the arrow mark *x* direction through gears 26 and 28.

Figure 3:
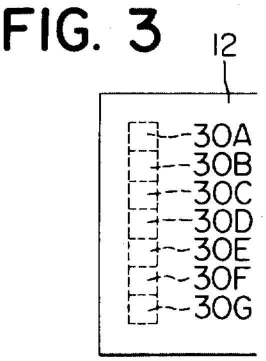
FIG. 3 shows an example of a printing head used in the invention, a plane view of a thermal head of seven dots or channels for one column having a heating element.
Figure 4:
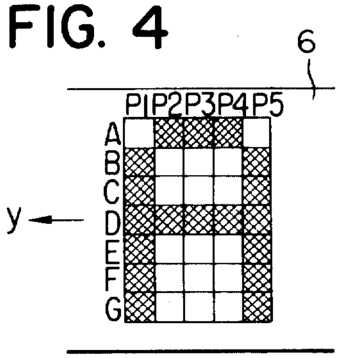
FIG. 4 shows the alphabetical character A printed in a 5 × 7 dot matix by feeding a recording medium by 5 columns for every one character using the head of FIG. 3.

The thermal head 12 in the aforesaid construction has, as shown in FIG. 3, seven heating elements 30A – 30G aligned in parallel with respective channels and in a single line perpendicular to the feeding direction y of the recording paper 6, and selects the dots or channels A–G constituting each line in five lines $P_1$–$P_5$ and colors them to create one printing character on said recording paper 6 as shown in FIG. 4. Upon each intermittant pause time corresponding to the intervals during five steps of rotation of the paper 6 by the stepping motor 24.

Figure 5:
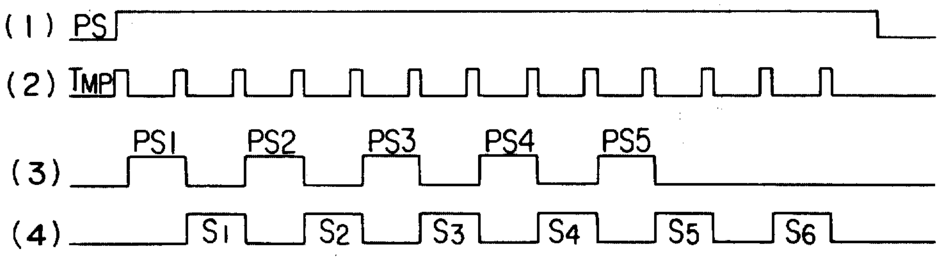
FIG. 5 is a timing chart indicating an example of pulse waveforms relating to the first embodiment generated by the control circuit of FIG. 2.
Figure 6:
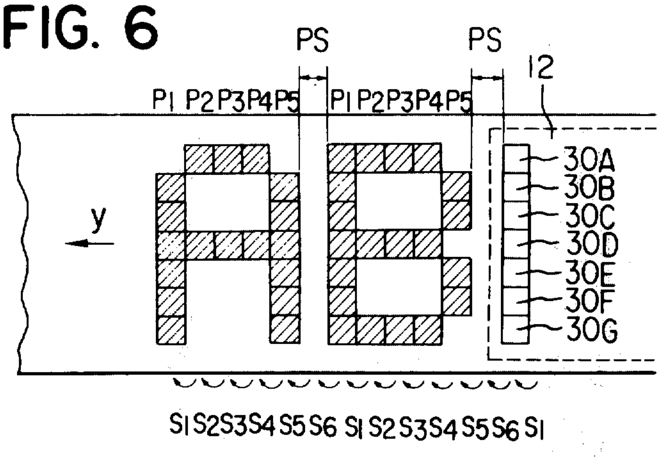
FIG. 6 shows a printing example obtained under printing control using the pulse timing of FIG. 5.
Figure 7:
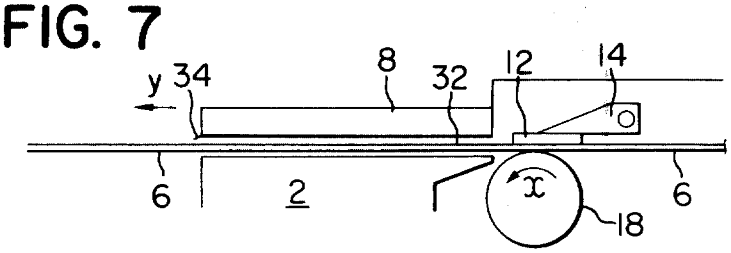
FIG. 7 is a cross-section of a printing control device of the invention for explanation of the case where a recording medium is extended manually in the y direction.
Figure 8:
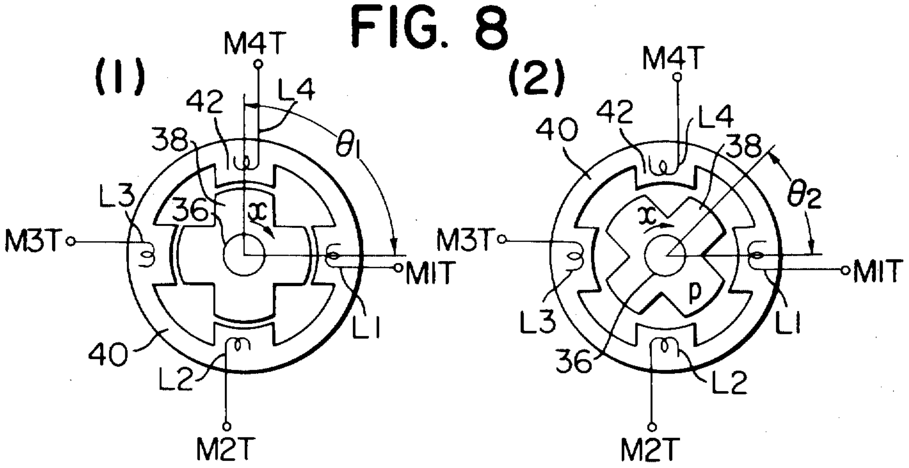
FIG. 8 is a cross-section of a motor for explanation of the case where a rotor is stopped at various positions.
Figure 9:
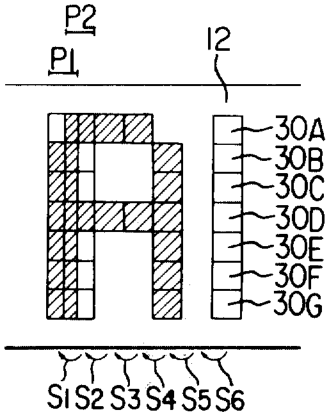
FIG. 9 shows a printing example of overlap printing.

The description is now given to the first embodiment which, in order to perform the above mentioned printing, generates a signal as shown in the timing chart of FIG. 5 from a control circuit. In printing one character A, for example, when a printing control signal PS1 is supplied to AND gate A (FIG. 2) through a line *lP*, dot printing signals SB, SC, SD, SE, SF, SG, for example, selected among the dots A – G are provided out from the gate A by a character generator CG and the thermal head 12 is energized by a means (not shown) thereby performing the printing of the dots B, C, D, E, F, and G corresponding to the first column $P_1$. Next, when an energizing signal $M_1$ is applied to a coil L1 (FIG. 8) of the stepping motor 24 by means of a ring counter LC1 (not shown, a circuit without flip-flop FO of LC2 shown in FIG. 11) and a septinary-quadrinary converter circuit (FIG. 11), the stepping motor 24 rotates the feed roller 18 in the arrow mark *x* direction through the gears 26 and 28, and thus the recording paper 6 is transmitted by the distance equivalent to one column. Therefore, when a printing control signal PS2 is next applied, the printing head 12 is located to the position opposing to the second column P2 on the recording paper 6. Then, the AND gate A is opened again with the signal PS2 corresponding to the second column P2 and dot printing signals SA and SD, for example, are applied to the head 12 by the character generator CG whereby the printing of the dots A and D is performed. Thereafter, the similar operation is repeated, and at the point of time when a printing control signal PS5 for the fifth column is applied, one character A composed by the five columns P1 – P5 is to be printed on the recording paper 6 as shown in FIG. 4. The printing head 12 is then opposed to the position equivalent to one column adjacent to the column P5 of the printed character obtained in the above process depending on a step control signal S5 next to said printing control signal PS5. Because of this reason, if the printing of one character is completed in this condition, when a printing control signal PS1 is applied to print the next character, no space can be taken between each printing character, and thus the resultant printing face becomes illegible. In order to prevent such inconvenience, the stepping motor 24 is rotated one more step by applying a further step control signal S6, and the printing head 12 is controlled opposite to the position spaced one column from the column P5 of the printed character for securing space equivalent to one column between the first line P1 of next the character. With the above described control signal, the character obtained on the recording paper 6 is as shown in FIG. 6, while the relation of the position of printed character columns P1 – P5 against the printing head 12 is changed as indicated by the arrow mark whenever each of the step control signals S1 – S6 is applied thereto. As a result, a space PS equivalent to one column is obtained between the printing head 12 and the fifth column P5 of the printed character B, which offers recommendable printing face. As shown in FIG. 7, the character obtained in this way is at the lower position 32 of the acryl window 8. Thus, if the printed portion is required to be separated from the housing 2, the recording paper 6 is pulled with the fingers in the arrow mark y direction until the printed portion comes out from the lower acryl window side and then the printed portion is cut with a cutter 34 provided at the acryl window 8. In this time, when the recording paper 6 is forced to extend in the arrow mark y direction as above described, the roller 18 pressing the recording paper is also rotated in the arrow mark x direction by the friction force. Because of this reason, if control with ordinary electric signals is effected, the stepping motor whose pole 38 of the rotor 36 and pole 42 of a field element 40 are in the accorded condition as shown in FIG. 8(1) is also changed to a standstill condition having disaccorded pole when rotated forcibly. If a control signal as shown in FIG. 5 should be applied in this motor condition, even when the step control signal S1 to step and rotate the stepping motor 24 is applied after the input of the printing control signal PS1 for printing the first column P1, the motor rotates only by the angle $\theta_1 - \theta_2$ from the condition shown in FIG. 8(2) while it normally rotates by $\theta_1$ in the step 1 as shown in FIG. 8(1). As a result, since the recording paper 6 which is to be transmitted for one column space by the stepping motor 24 is actually fed for the distance less than the one column space, the printing head 12 is disposed opposite to the position overlapping on the first column. Therefore, when the printing control signal PS2 for making the printing of second column P2 is applied, the second column is printed in overlapping on the first column resulting in so-called overlap printing, and a complete printing is not obtained.

That is, it can be said that the control signal given in the timing chart of FIG. 5 is not suitable for the printing mode wherein the recording medium is intermittently transmitted with a stepping motor, and after completion of printing the recording medium is manually pulled to be cut off and immediately thereafter, another character is to be printed.

A second embodiment of the printing control device of the invention is constructed so as to eliminate the aforementioned disadvantages for making complete printing. It is intended to control the printing mechanism shown in FIG. 2 by generating the control signal as indicated in the timing chart of FIG. 10 by the previously mentioned control circuit. In other words, in printing one character, a step control signal SO is at first applied to the stepping motor 24 so that it rotates by the angle $\theta_1$ when it is at a standstill in the condition of FIG. 8(1), or by the angle $(\theta_1 - \theta_2)$. when it is stationary in the condition of FIG. 8(2), whereby the pole 38 of the rotor 36 and the pole 42 of the field element 40 are made opposite to each other. Thereafter, the printing control signal PS1 for printing the first column P1 is applied to the printing head 12. Thus, when the step control signal S1 is applied to the steppong motor 24 after the completion of the first column P1 printing, the motor steps and rotates by the expected rotary angle $\theta_1$ and the recording paper 6 is transmitted correctly by one column distance. This may prevent such trouble that the printing head 12 prints the second column P2 over the already printed first column P1 upon the application of the printing control signal PS2 for the second column P2.

In short, the printing control device according to the second embodiment of the invention adjusts the step start point of the stepping motor before initiation of printing to let the motor perform accurate step operation for step control signals to be later applied thereto, thereby enabling one to obtain complete printed characters when recording while a character or sign which is divided into a plural number of columns is separated at every column and a recording paper is intermittently transmitted by means of a stepping motor. In addition, even in the other line printer and moving head type printing apparatus, there is a possibility of pulling a recording medium. Thus this second embodiment may offer a wide range of application.

Figure 12:
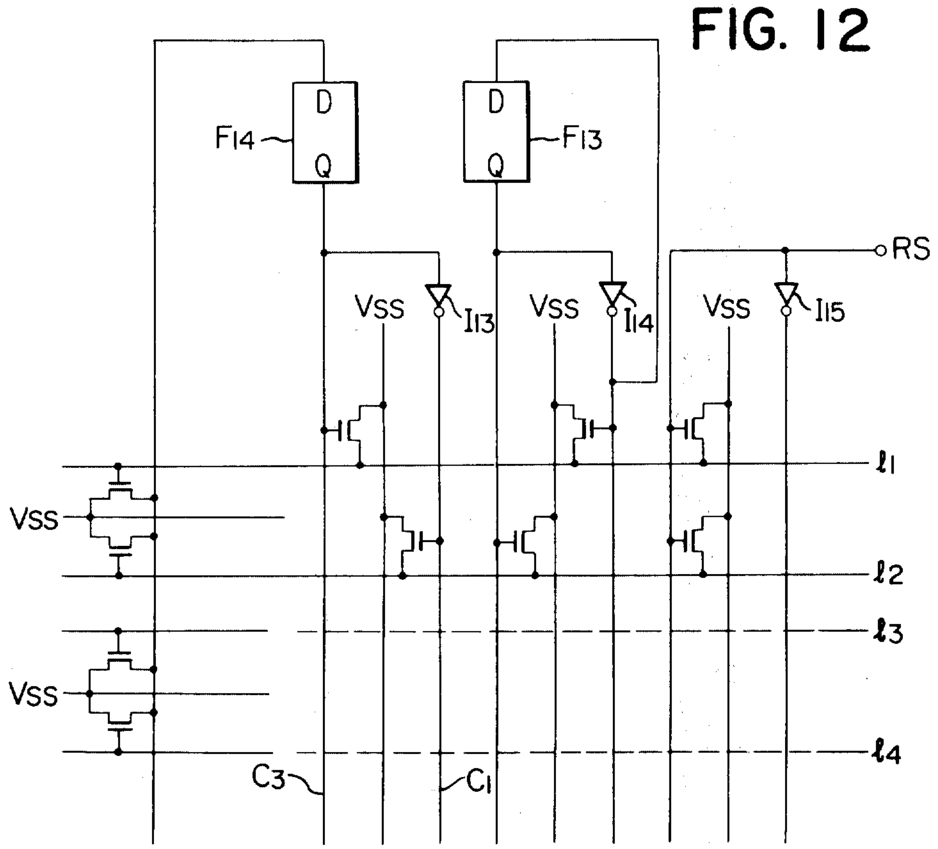
FIG. 12 shows an example of the matrix part of FIG. 11.
Figure 10:
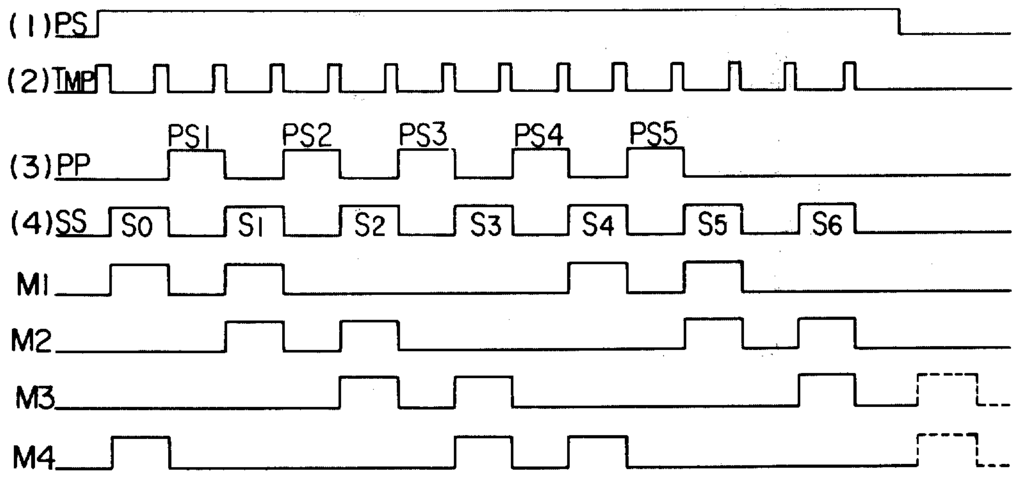
FIG. 10 is a timing chart indicating an example of pulse waveforms relating to the second embodiment generated by the control circuit of FIG. 2.
Figure 11A:
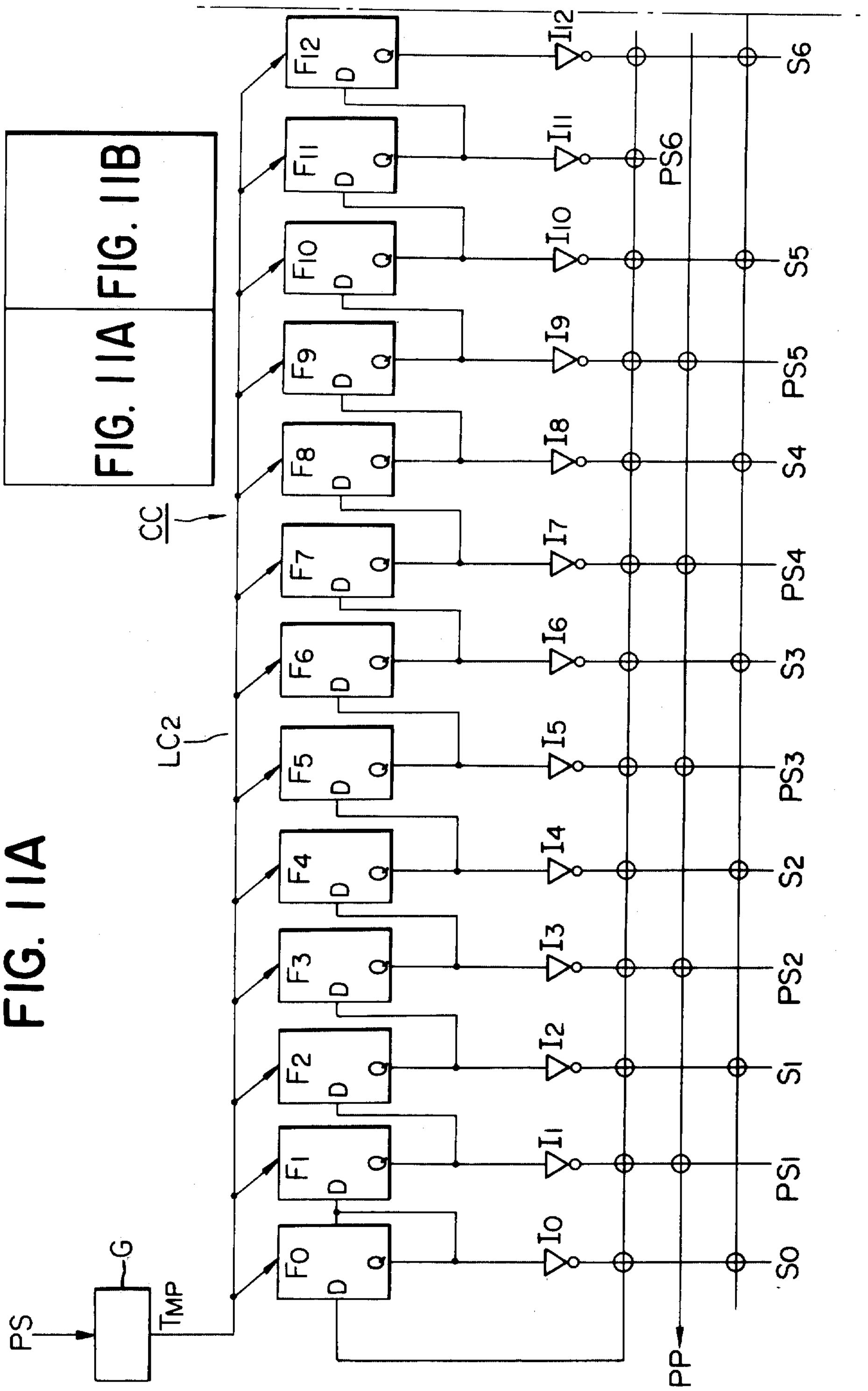
FIGS. 11A and 11B, shows the control circuit of FIG. 2 generating the pulse wave of FIG. 10 and one embodiment thereof.
Figure 11B:
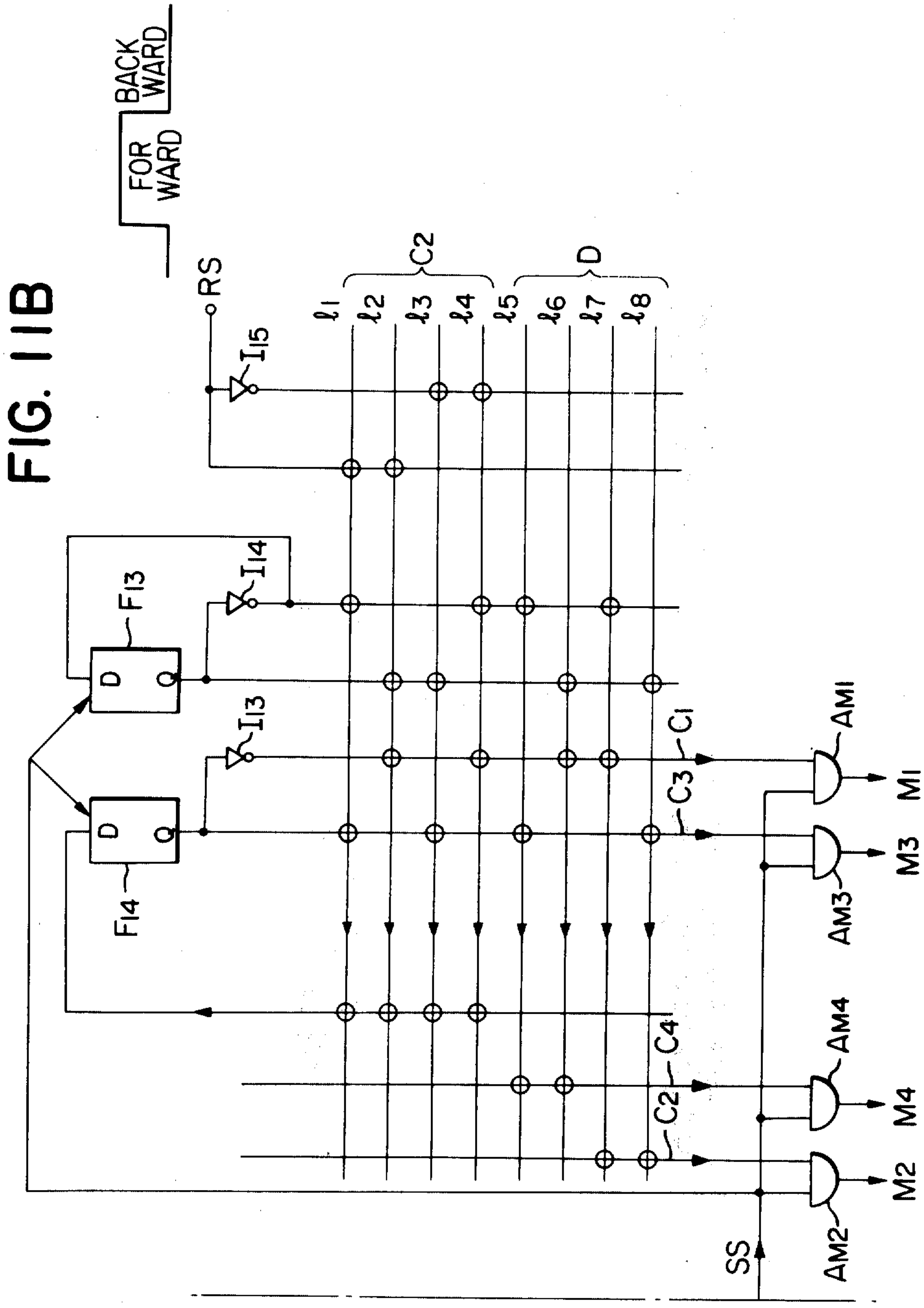

FIG. 11 indicates an example of a circuit to obtain the control signal shown in the timing chart of FIG. 10, which consists of a ring counter comprising flip-flops FO – F12. In the circuit of FIG. 11, the outputs Q of all flip-flops FO – F12 are initially 1 and thus, all inverters $I_0$–$I_{12}$ have the output 0. Therefore, the input terminal D of the flip-flop $F_0$ is being supplied with the input 0. In this condition, when one of the keys 4 in FIG. 1 is depressed, a high level key signal PS is generated during the time of printing at least one character as shown in FIG. 10 (the generator circuit is not shown) and impressed to a gate circuit G of FIG. 11. When a clock pulse TMP which is generated upon the start of printing is outputs from this output terminal, the output Q of the flip-flop $F_0$ becomes 0, and this 0 output is applied to the inverter $I_0$ as an input as well as impressed to the input terminal D of the next flip-flop $F_1$. Thus, the inventer $I_0$ provides the output 1 or the step control signal $S_0$ which is given to the stepping motor before printing the first column P1. Further, when the next clock pulse is applied in succession, the Q output of the flip-flop $F_1$ is turned to 0, and this output 0 is applied to the inverter $I_1$ as an input as well as to the input terminal D of the next flip-flop $F_2$. Thus, the inverter $I_1$ provides the output 1 or the printing control signal PS1 for specifing the printing of the first column P1. In this way, the flip-flops F0 – F12 successively provide the 0 output in synchronization with the clock pulse and finally, as shown in FIG. 10, the printing control signals PS1 – PS5 corresponding to each column of P1 – P5 and the step control signals SO – S5 for stepping the recording paper 6 one column by one column to change the printing column are alternately obtained. Moreover, with the printing control signal PS6 obtainable from the flip-flop F11 prohibited, the step control signal S6 for stepping the recording paper 6 by one column to provide a further space between the next printing character can be obtained. The printing control signals PS1 - PS5 obtained in the above way are impressed to the AND gate A of FIG. 2 to control the output of the character generator CG. The step control signals SO - S6 are also impressed to the flip-flops F13 and F14 within a septinary-quadrinary circuit. The converter circuit consists of matrix comprising MOS transistors as shown in FIG. 12, for example. It is assumed that the RS terminal is now being impressed with a high level signal which means a normal rotation command for the rotor 38. The flip-flops F13 and F14 are taken the initial state in the reset and set conditions. The flip-flops F13 and F14 are set and reset when the step pulse SO is impressed. As a result, an output pulse is generated at a line C1 of the matrix. This signal is transmitted together with the step pulse SO to the AND gate AM1 as an input thereto. With this input, the gate opens and impresses the input terminal $M_1T$ of the coil $L_1$ in FIG. 8(1) with an excitation pulse $M_1$ of the coil $L_1$. The rotor 38 is therefore rotated by 90° to feed the recording medium for the distance equivalent to one column. As the printing control signal PS1 is then provided from the circuit LC2, one column of printing is performed. Next, the step pulse $S_1$ is provided to reset the flip-flops F13 and F14. By this operation, an output signal is produced at the $l7$ of the matrix and thus, an output signal is generated at the line C2, and the AND gate AM2 is opened and the excitation pulse M2 for the coil L2 is provided to excite the coil L2. The rotor 38 is then further rotated by 90°. Likewise is the previous description, thereafter, the AND gates AM3 and AM4 are opened with the step pulses S2 and S3. The output pulses M3 and M4 excite the coils L3 and L4 thereby rotating the rotor 38. The above mentioned operation and the operation taken thereafter are indicated as in the Graph below.

| | F14 | F13 | C1 | C2 | C3 | C4 | SS | | | | | | | | | | |
|---|---|---|---|---|---|---|---|---|---|---|---|---|---|---|---|---|---|
| 1 | 0 | 0 | 1 | 1 | 0 | O | | S1 | S5 | | S2 | S6 | | S3 | S0 | S4 | |
| 2 | 1 | 1 | 0 | 1 | 1 | 0 | | S2 | S6 | | S3 | | S0 | S4 | S1 | S5 | |
| 3 | 1 | 0 | 0 | 0 | 1 | 1 | | S3 | | S0 | S4 | | S1 | S5 | S2 | S6 | |
| 4 | 0 | 1 | 1 | 0 | 0 | 1 | S0 | S4 | | S1 | S5 | | S2 | S6 | S3 | | S0 |

Figure 14:
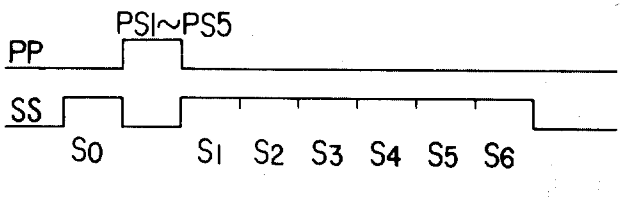
FIG. 14 is an example of a timing chart for the feeding of recording medium when one character is simultaneously printed.
Figure 13:
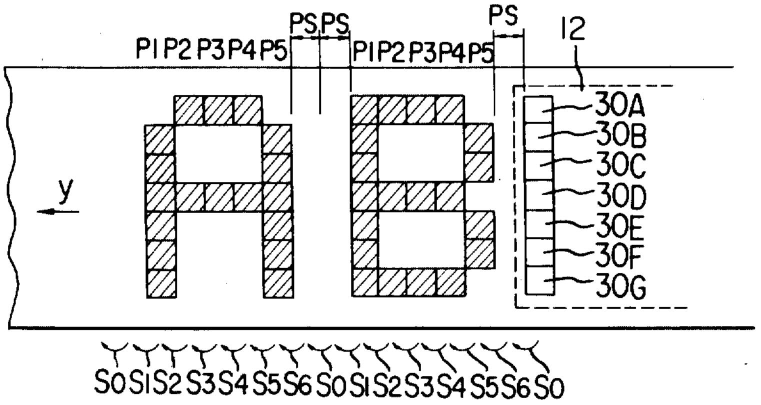
FIG. 13 shows an example of printing obtained through the control circuit of FIG. 11.

With the step pulse S3, the rotor 38 of FIG. 8(1) rotates 360° and returns to the initial position. The printing of one character in a 5 × 7 matrix is completed with the step pulses S4 and S5 to be later applied. The recording paper is fed by one column distance with the step pulse S6 later further applied, and one cycle of the control of one character printing is ended. That is, one cycle in the embodiment of the invention means; depression of first character key → SO(early step) → $PS_1$ → $S_1$ → $PS_2$ → $S_2$ → $PS_3$ → $S_3$ → $PS_4$ → $S_4$ → $PS_5$ → $S_5$ → $S_6$ (final step). Next, with the second character key depressed, the output signal of SO(early step) is generated from the circuit LC2. This step signal SO gradually changes the previous condition of the flip-flops F13 and F14 as shown in the above Graph and thus usually takes the space of two columns between characters and further rotates the rotor 38 to usually 90° advance from the previous state thereby turning it intermittently by the function of the septinary-quadrinary converter circuit; FIG. 13 shows an example of printing obtained in this way. The early step pulse SO is preferable, since, when the rotor 38 is located at an irregular position by manual feeding, for example, as shown in FIG. 8(2), it is capable of correcting the position as shown in FIG. 8(1). It is also obvious that if the location of FIG. 8(2) is the regular position of the rotor 38 depending on the type of motor, the step pulse SO has the function of correcting the rotor position as it does in the case of FIG. 8(1). Further, in order to assure the motor rotation, the embodiment employs a two-phase excitation system as shown in the above Graph, that is, the AND gates AM1 and AM2, AM2 and AM3, AM3 and AM4 are opened simultaneously to excite the coils L1 – L4 two by two. However, for the purpose of simplification, it has been explained as a single-phase excitation system in the preceeding description. Therefore, in the condition of FIGS. 8(1) and (2), the location (1) is the irregular position of the rotor 38 in case of the two-phase excitation system and the location (2) is the regular position. Thus, the previous description is reversed. However, it is easy for a person skilled in the art to take various embodiments with different numbers of rotor poles depending on the type of motor. Besides, the previous description has been referred mainly to the case where the heating element of the printing head is one column, but even if the printing head consists of a 5 × 7 (5 columns, 7 lines) dot matrix, for example, overlap of characters and uneven character space may be prevented by the same method as in the former case. That is, as shown in FIG. 14, the motor is made to rotate to the extent equivalent to one column before performing the printing of one character in one timing cycle. Moreover, if the motor step signals are increased as S7, S8 . . . , the printed character space can be set to one column, two columns or more at option depending on the printing head construction or printed characters alignment.

We claim:

1. A printing control device for use in a portable electronic apparatus comprising:

a printing head fixedly disposed at a printing position and arranged to print a character on a tape-form recording medium, portions of said character being selectively printed along predetermined lines on said recording medium;

means including a step motor having a rotor and a plurality of coils arranged to provide intermittent rotation of said rotor by a predetermined angle in response to step pulses applied to said coils;

means for advancing said recording medium by predetermined incremental distances in response to the intermittent rotation of said rotor; and recording medium feed control means coupled to said step motor and including a ring counter for supplying step pulses to advance said recording medium one said predetermined distance before and after the generation of printing control signals corresponding, respectively, to the initial and last lines of a character to be printed on said recording medium by said printing head, said step pulses including a first step pulse being operative to align the position of said rotor of said step motor means at a start position prior to the commencement of printing of said character on said recording medium by said printing head.

2. A device as defined in claim 1 in which said printing head comprises a head having printing elements arranged in a single line having a predetermined width, wherein each printed character is formed by energizing selected ones of said elements and generating said pulses to successively advance said medium one line width after each energization of said elements until a character is completed, said ring counter including a circuit arranged to generate two step pulses after the completion of a said character and to apply the two step pulses to said plurality of coils of said step motor means so that said recording medium is fed a distance corresponding to twice said predetermined line width.

3. A printing control device comprising:

a thermal printing head fixedly disposed at a printing position and having a plurality of dot type printing elements aligned in a single line having a predetermined width, wherein each printed character is formed by advancing a recording medium past said printing head and energizing selected ones of said elements;

a cylindrical roller mounted on a shaft and disposed adjacent said thermal printing head and arranged to feed said recording medium past said printing head;

means for mechanically biasing said thermal printing head toward roller so that heat is transferred to said recording medium;

means including a step motor for transmitting rotative force to said roller shaft to intermittently rotate the roller; and control circuit means coupled to said printing head and said step motor for successively and alternately generating a plurality of printing control signals operative to control the selective energization of said elements of said printing head and a plurality of motor step control signals operative to intermittently rotate said step motor to feed said recording medium for a predetermined width at a time, wherein said plurality of motor step control signals includes signals operative to advance said recording medium two said predetermined widths immediately after the generation of the printing control signal corresponding to the last line of a character printed by said printing head.

4. A device as defined in claim 3 in which said control circuit means further includes a circuit arranged to generate a motor step control signal for advancing said recording medium one said predetermined width prior to the generation of the printing control signal corresponding to the first line of a character printed by said printing head.

5. A printing control device comprising:

a thermal printing head fixedly disposed at a printing position and having a plurality of dot type printing elements aligned in a single line having a predetermined width, wherein each printed character is formed by advancing a recording medium past said printing head and energizing selected ones of said elements;

a cylindrical roller mounted on a shaft and disposed adjacent said thermal printing head and arranged to feed said recording medium past said printing head;

means for mechanically biasing said thermal printing head toward said roller so that heat is transferred to said recording medium;

means including a step moror for transmitting rotative force to said roller shaft to intermittently rotate the roller; and control circuit means for successively and alternately generating a plurality of printing control signals operative to control the selective energization of said elements of said printing head and a plurality of motor step control signals operative to rotate said step motor means intermittently to feed said recording medium for one predetermined width at a time, wherein said plurality of motor step control signals includes a signal for stepping said recording medium one said predetermined width prior to the generation of the printing control signal corresponding to the first line of a character printed by said printing head.

6. A printing control device comprising:

a printing head fixedly disposed at a printing position and arranged to print a plurality of dot matrix type characters on a recording medium, said printing head having a plurality of print elements in a line of predetermined width, wherein each printed character is formed by advancing said recording medium past said printing head and energizing selected ones of said elements;

printing control circuit means for generating a plurality of printing control signals operative to selectively energize said elements;

means including a step motor having a plurality of coils arranged to provide intermittent rotation of said motor means by a predetermined angle in response to step pulses applied thereto;

means for advancing said recording medium by incremental distances in response to the intermittent rotation of said motor means;

recording medium feed control means coupled to said step motor means and including a ring counter for supplying step pulses to advance said recording medium one said predetermined width before and after the generation of printing control signals corresponding, respectively, to the initial and last lines of a character to be printed on said recording medium by said printing head.

7. A device as defined in claim 6 in which said ring counter includes flip-flops for supplying said step pulses.

* * * * *